United States Patent [19]

Jarvik

[11] Patent Number: 5,577,981
[45] Date of Patent: Nov. 26, 1996

[54] VIRTUAL REALITY EXERCISE MACHINE AND COMPUTER CONTROLLED VIDEO SYSTEM

[76] Inventor: Robert Jarvik, 124 W. 60th St., New York, N.Y. 10023

[21] Appl. No.: 513,671

[22] Filed: Aug. 4, 1995

Related U.S. Application Data

[63] Continuation-in-part of Ser. No. 183,522, Jan. 19, 1994, abandoned.

[51] Int. Cl.$^6$ ..................................................... A63B 24/00
[52] U.S. Cl. ............................... 482/4; 482/902; 434/247; 73/379.01
[58] Field of Search ............................... 482/1–9, 52, 54, 482/55, 57, 71, 72, 900–903; 434/267; 73/379.01; 395/152–154; 345/106, 156; 364/410; 273/438

[56] References Cited

U.S. PATENT DOCUMENTS

| | | |
|---|---|---|
| 4,408,613 | 10/1983 | Relyea . |
| 4,489,938 | 12/1984 | Darzinskis . |
| 4,558,864 | 12/1985 | Medwedeff . |
| 4,735,410 | 4/1988 | Nobuta ................................ 482/902 X |
| 4,906,192 | 3/1990 | Smithard et al. .................... 482/902 X |
| 4,919,418 | 4/1990 | Miller . |
| 4,934,694 | 6/1990 | McIntosh . |
| 5,184,319 | 2/1993 | Kramer . |
| 5,185,561 | 2/1993 | Good et al. ............................ 434/45 X |
| 5,213,555 | 5/1993 | Hood et al. .......................... 482/902 X |
| 5,227,985 | 7/1993 | DeMentheon . |
| 5,229,756 | 7/1993 | Kosugi et al. ........................... 345/106 |
| 5,308,296 | 5/1994 | Eckstein ............................... 482/902 X |
| 5,320,538 | 6/1994 | Baum ................................... 434/307 R |
| 5,362,069 | 11/1994 | Hall-Tipping ........................... 273/438 |

FOREIGN PATENT DOCUMENTS

| | | | |
|---|---|---|---|
| 3404539 | 8/1985 | Germany ................................ 482/902 |

OTHER PUBLICATIONS

"Virtual Environment Display System" by Fisher et al, ACM 1986 Workshop on Interactive 3D Graphics, Oct. 23–24, 1986, pp. 1–11.

*Primary Examiner*—Joe Cheng

[57] ABSTRACT

This invention relates to computer controlled exercise machines and provides the user with a wide variety of interactive exercise options controlled by software. A virtual reality hybrid of virtual and real environments is provided which permits the user to perform significant physical exertion by applying forces to the machine while viewing images on a head mounted display. The invention permits the user to view his own hands and body superimposed over a computer generated image of objects that are not actually present while maintaining parts of the exercise machine that the user physically contacts, such as a handle, superimposed over the computer generated image. As the user exerts forces against the machine (such as the handle) he perceives that he is exerting forces against the objects the images represent. The invention includes a video camera and computer adapted to record images from the real world which may be combined with computer generated images while retaining the proper spacial orientation to produce a composite virtual reality environment. Virtual reality exercise regimens adapted to the user's individual capabilities, virtual reality exercise games, virtual reality competitive sports, and virtual reality team sports are disclosed.

6 Claims, 5 Drawing Sheets

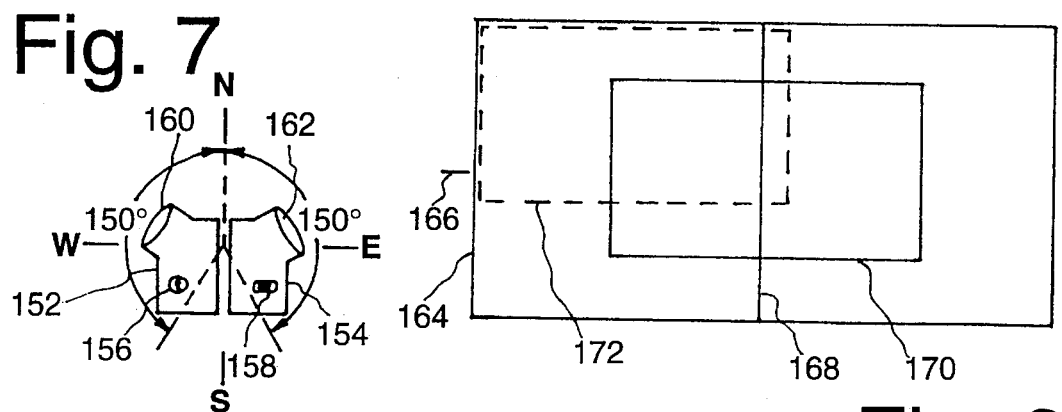
Fig. 7
Fig. 8
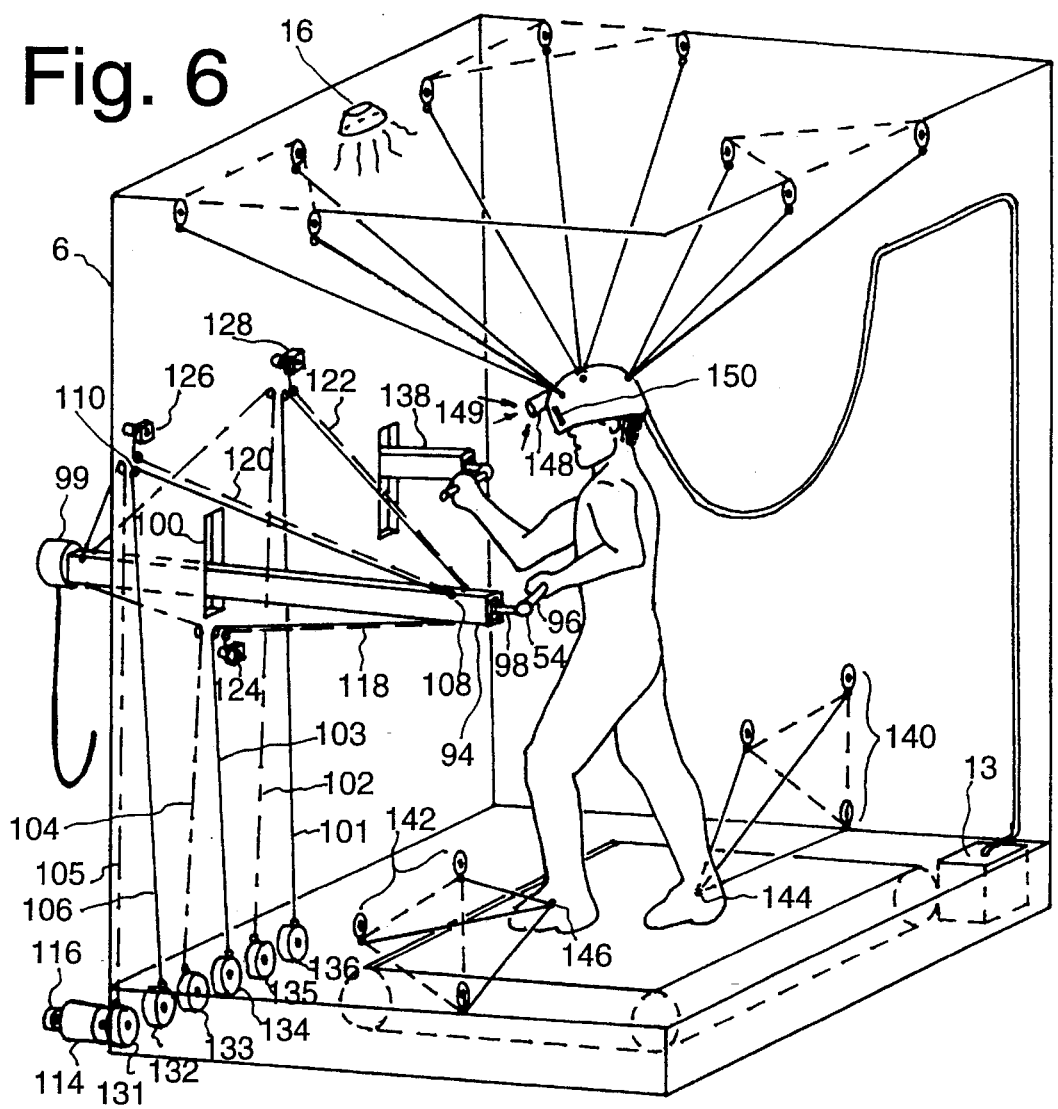
Fig. 6

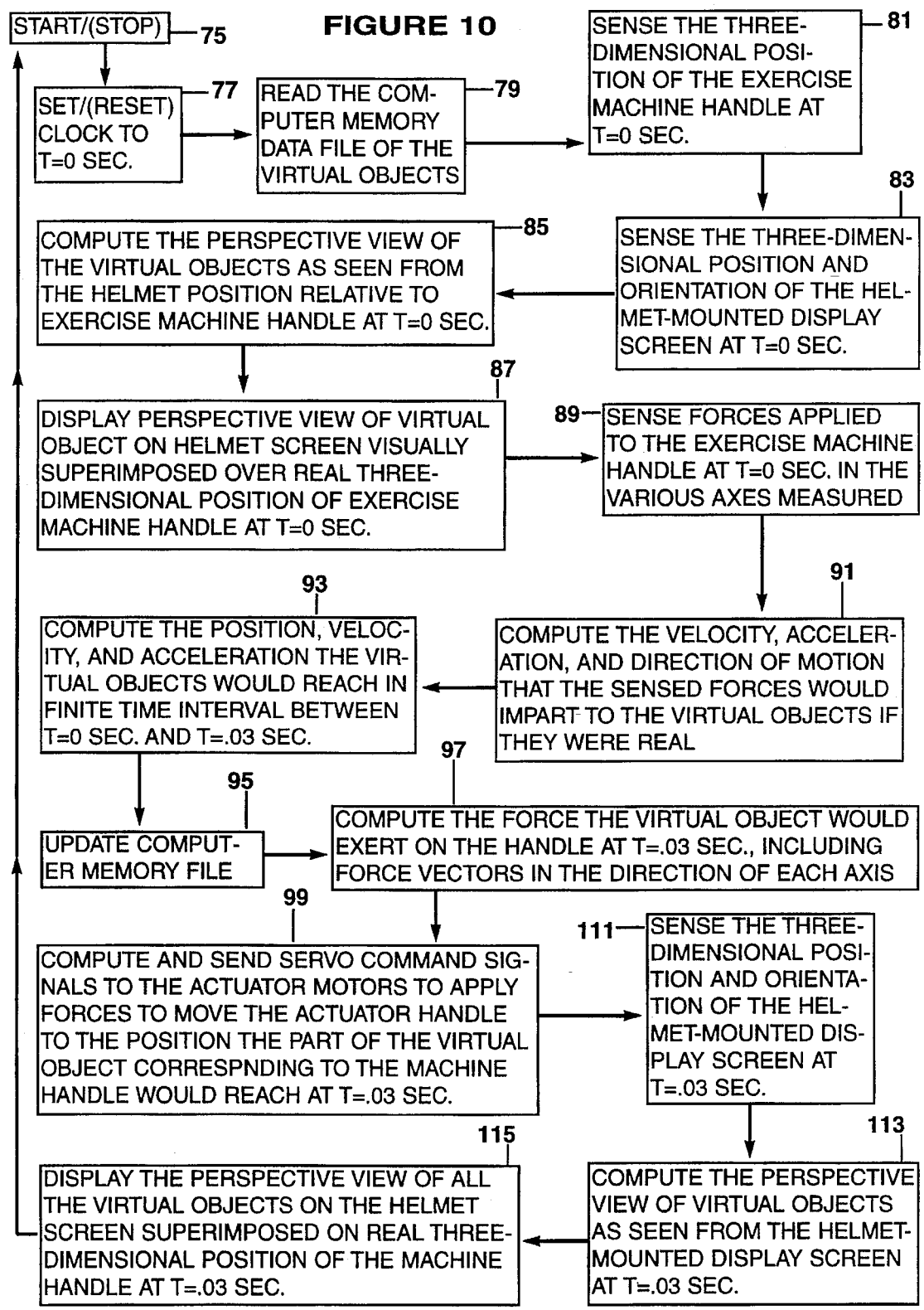

VIRTUAL REALITY EXERCISE MACHINE AND COMPUTER CONTROLLED VIDEO SYSTEM

This is a continuation-in-part of the application Ser. No. 08/183,522, filed Jan. 19, 1994, now abandoned.

FIELD OF THE INVENTION

This invention relates to computer controlled exercise machines and provides the user with a wide variety of interactive exercise options controlled by software. A virtual reality environment or a hybrid of virtual and real environments is provided which permits the user to perform significant physical exertion by applying forces to the machine while viewing images in such a fashion that the user perceives that he is exerting forces against the objects the images represent. The system may incorporate advanced image presentation methods, such as computer graphics, holography, or 3-D motion picture projection, and may include interactive entertainment, competitive, or motivational software, together with sound, vibration, and other special effects to enhance the sense of realism experienced by the user.

BACKGROUND OF THE INVENTION

The positive benefits of exercise are well known and regular exercise is increasingly becoming a part of the modern lifestyle. Particularly in urban and suburban settings, exercise available in health clubs is often repetitive and boring. Attention and motivation are key to success but are often neglected or not creatively approached by designers of exercise equipment. Concurrently, the fields of robotics, simulation, computer graphics, and virtual reality, are all advancing rapidly. These are being applied in entertainment, industrial, military, space, and rehabilitation medicine applications, but have received little attention in conditioning and sports medicine.

Generally, in interactive robotics using such methods as remotely actuated mechanisms or in simulators, controls incorporating force sensing and position detection may be used. Virtual reality systems applied to simulations such as preparation for space missions or strictly for entertainment also use force and position detectors. But these inventions differ fundamentally from exercise machines in that they are not specifically adapted to apply the type of load to the user which results in the most beneficial conditioning effect. In exercise machines, exertion to the point of fatigue, as well as to the limits of strength, are important to the achievement of health benefits by the user. Exercise machines are designed to maximize the safe strain on the user. By contrast, interactive robotics and machine controls are designed to minimize strain on the operator and to reduce fatigue thereby increasing worker output and accuracy.

Computer controlled exercise machines which utilize a virtual reality or hybrid environment must be robust, must be capable of applying loads up to the usual limits of human strength, and must be suited to many repetitive cycles. Delicate sensors susceptible to flex fatigue failure are undesirable. Components must be adapted to withstand exposure to sweat without corrosion or electrical failure. Skin abrasion and blister formation should be avoided. Typical virtual reality components such as sensor-equipped gloves and body suits, and heavy visual display helmets are not well adapted to exercise applications.

U.S. Pat. No. 5,184,319 entitled FORCE FEEDBACK AND TEXTURES SIMULATING INTERFACE DEVICE discloses a force-actuating device which transmits force to a pressure-sensing body part and also includes sensors to measure the actual force applied to the body part as well as additional sensors to measure joint angles. These components may be incorporated into a "feedback glove" permitting texture information and other simulation of grasping in a virtual reality system. The force transmitters and sensors are intended for relatively low loads, such as at finger joints, and no applications for exercise are anticipated. The invention is principally concerned with transfer of information at the man-machine interface rather than the transfer of significant conditioning forces at the interface as are required for effective exercise.

U.S. Pat. No. 5,227,985 entitled COMPUTER VISION SYSTEM FOR POSITION MONITORING IN THREE DIMENSIONS USING NON-COPLANER LIGHT SOURCES ATTACHED TO A MONITORED OBJECT, relates to ". . . monitoring the position and orientation of an object while it is displaced by an operator, who is enabled to interactively control various devices such as teleoperated mechanisms or graphics displays presented to his eyes while his motions are sensed and computed." The invention finds application in "communication methods with the virtual world", and although it could be incorporated as a component of a computer controlled exercise machine the patent makes no mention of and does not anticipate this use.

U.S. Pat. No. 4,934,694, entitled COMPUTER CONTROLLED EXERCISE MACHINE, discloses a device to apply computer controlled forces to the user for the purpose of exercise and to measure performance. Although the device includes a display, no aspect of virtual reality is incorporated.

A number of additional prior art patents disclose exercise inventions having computer control but do not include the concept of virtual reality or any perception that the user is exerting exercise force to manipulate the image of an apparent object in his visual field. These include U.S. Pat. No. 4,235,437, entitled ROBOTIC EXERCISE MACHINE AND METHOD, and U.S. Pat. No. 4,919,418 entitled COMPUTERIZED DRIVE MECHANISM FOR EXERCISE, PHYSICAL THERAPY AND REHABILITATION.

Additional prior art patents incorporate games displayed on a video monitor together with an exercise apparatus to increase motivation and interest during exercise or conversely, to include useful exercise in game playing. Among these are U.S. Pat. No. 4,408,613, entitled INTERACTIVE EXERCISE DEVICE, U.S. Pat. No. 4,489,938, entitled VIDEO COMPUTER SYSTEM CONTROLLED BY OPERATION OF ELASTOMERIC EXERCISE APPARATUS, U.S. Pat. No. 4,542,897, entitled EXERCISE CYCLE WITH INTERACTIVE AMUSEMENT DEVICE, and U.S. Pat. No. 4,558,864 entitled HANDGRIP EXERCISING, COMPUTER GAME CONTROLLER.

SUMMARY OF THE INVENTION

Exercise machines of the present invention range from relatively simple means of creating the illusion in the mind of the user that he is exercising in a computer-presented virtual reality environment to more complex highly interactive systems in which the user can control the "place" in the virtual world that he chooses to "go" and the activities that he chooses to do in that "place". The former includes a virtual reality exercise bicycle in which the user controls the speed and direction of his trip on a virtual road via the handle bars, pedals and brakes, or a treadmill on which the user runs in a virtual race.

The term "virtual reality" as used in the present technological vernacular is not succinctly defined. It generally refers to computer systems which create the illusion that the user is actually present in a tangible physical environment and can interact with objects which appear to be present when in actuality the images viewed are of objects which are not physically present and are displayed using information present in the computer. As used in this patent document, the term "virtual reality" is used to refer to any illusionary environment which visually creates the false impression that the individual is actually present in a three-dimensional space and can interact with objects appearing to be present. The image presented may be derived from computer graphics, photography, or art work, so long as the false illusion is created that the individual is interactively present within the space represented by the image. As used in this patent document, the term "hybrid virtual reality" refers to the inclusion of real objects in addition to images representing objects that are not physically present, both within view of the individual experiencing the "hybrid virtual reality". For example, a system where the user both sees his real hand and sees the image of an object not actually present that appears to be held in his hand is an example of "hybrid virtual reality".

Interactive "virtual reality" or "hybrid virtual reality" exercise machines of the present invention provide a visual image of an illusory environment with which the user interacts by applying force to the machine structure. The position of "virtual" objects presented in the visual field by a computer via a display such as a head-mounted video screen, the orientation of the user with respect to the "virtual" objects, and the forces applied between the user and the machine structure at various locations, are all monitored by the computer. As the user applies forces to the machine, the parts of the machine structure are physically moved, creating a changing arrangement of machine elements during use. The forces required of the user to cause these changes are controlled by the computer in such a way that the user perceives that he is interacting with the "virtual" objects presented in the visual field and moving within the visual environment. Other components may be included to increase the sense of realism, such as loudspeakers to provide environmental sounds. The computer may utilize a CD-ROM device or other high capacity memory device with advanced graphics, and may also incorporate 3-D images.

One preferred embodiment of the invention is intended for installation in health clubs and gymnasiums. It includes a booth-like enclosure which contains an exercise mechanism and provides an externally darkened setting permitting images projected on a partially transparent visor to be clearly viewed. The user wears a lightweight exercise suit which has a fluorescent surface illuminated by ultraviolet light. Thus, the user sees both the image projected on the visor and his own body in superimposed alignment. The inside of the booth is a black-light-absorbent surface and, other than his own body, only the "handle grip" portions of the machine structure are visible to the user through the visor. The software, sensors, and computational algorithms are such that the computer matches the overlay of the projected image with the real positions of the exercise machine "handles" such that the handles appear to be part of the picture. There may be multiple such real physical objects which are part of the movable machine structure against which the user can exert forces, but other than them, in this embodiment, the user cannot "touch" the virtual object. In this sense, the device is a hybrid between actual reality and virtual reality.

As an example, to envision how an image incorporating such a "handle" is composed, imagine a simple view of a wall with a door within a frame. In the projected image, a picture of a door handle is superimposed in the visual field over a cylindrical extension of the exercise machine, connected to a powered actuator. The headset and visor the user is wearing includes sensors which permit the computer to track its exact position and alter the projected image so that even when the user moves his head, the image appears stationary, with the door handle remaining in the same apparent position. The user reaches out grasps the handle and sees his hand grasp the handle. He simultaneously feels the handle because he is touching a real physical object. Then, as the user pulls the handle to open the door, the machine provides a particular force of resistance and path of motion of the handle, which is kept in correspondence to a changing computer-generated image of the scene with the door swinging open on its hinges. The user perceives that he has opened a virtual door, when actually he has only pulled on a portion of the machine's mechanism.

The exercise machine may have many interchangeable "handles" of different size, shape, hardness, and texture, that are held in a storage area and may be removably affixed to the machine utilizing a mechanism similar to a tool changer such as used with a computer controlled milling machine. This is accomplished without the attention of the user, and permits an appropriate surface to be contacted by the user to exert the necessary forces for the exercise while reasonably well matching the surface represented in the image. Thus, during the exercise session, as the user reaches, grasps, and manipulates objects in the displayed image, the real objects he is contacting and moving provide the computer with position and force information necessary to update the display image. As a further example, an exercise regimen might be composed of a trip through a virtual obstacle course, where the user has the sensation of climbing over objects, pushing objects aside, pulling his body up a pole, and the like, and the pace through the course, as well as the path chosen, may be determined by the user.

Numerous other embodiments of the invention are possible, including devices which utilize full virtual reality in which the user sees only a computer display and does not directly also see either parts of his own body or any other real physical objects, hybrid embodiments where the user sees a video camera image of his own body superimposed over computer-generated images, and embodiments where two or more users participate simultaneously in a computer-mediated physical competition such as virtual bicycle racing or virtual team sports.

OBJECTS OF THE INVENTION

Thus, the major objective of the present invention is to provide a computer controlled exercise machine which creates the illusion that the user is present in a visually-represented three-dimensional space containing objects with which the user can interact with sufficient exertion to enhance the user's health.

Additional objects of the invention include the following;
(a) To provide relatively inexpensive exercise machines capable of implementing a great variety of exercise regimens through software, (b) To provide "virtual reality" exercise machines and software capable of permitting interactive decision making by the user during the course of the exercise including the user's choice of which objects in an image to manipulate or where within a "virtual environment" the user chooses to look or to go, (c) To provide "virtual reality" computer controlled exercise machines capable of matching the strength and exertion level available to the physical capability of the user, (d) To provide "virtual reality" computer controlled exercise machines capable of monitoring the physical performance of the user during a workout, (e) To provide exercise machines utilizing numerically controlled multiple axis actuators to simulate muscular actions such as lifting, pushing, pulling or twisting objects by hand, and to simulate other actions of the body such as walking, running, or pedaling, (f) To provide computer controlled exercise machines by which two or more individuals can compete in real time simulated physical competition such as bicycle racing, (g) To provide computer controlled exercise machines equipped to stimulate several senses including vision, touch, sound, etc. and thereby enhance the user's perception that computer generated images are real objects, (h) To provide computer controlled exercise machines utilizing a combination between "virtual reality" and actual reality thereby achieving many of the visual effects available with entirely computer-generated environments while applying the high forces necessary for physical conditioning utilizing rugged mechanical components capable of withstanding repeated use, (i) To provide sensor and actuator components of "virtual reality" exercise machines well suited to the functional interface between the user and the computer under the stress and strain of exercise.

(j) To provide attention-getting, emotionally stimulating mental activity integrated with physical exercise tasks, including decision-making, satisfaction of curiosity, competition, game playing, and excitement, (k) To provide photographic means of recording and integrating video camera images into "virtual reality" environments, such as those which may be used with exercise machines.

BRIEF DESCRIPTION OF THE DRAWINGS

FIG. 6 is a perspective view of an additional embodiment of the invention including a booth-like enclosure, exercise apparatus with boom and actuators, sensors for both handle position measurement and leg position measurement, and the computer.

FIG. 7 is a diagrammatic top view of an array of two video cameras oriented in the north/south direction.

FIG. 8 is a rectilinear map of the combined view area of both of the two video cameras illustrated in FIG. 7, with the outlined presentation field of the video display screen shown in two different positions relative to the border of the overall camera view area.

FIG. 10 is the computer program of the preferred embodiment of the present invention for using to superimpose a computer generated image of a scene containing virtual objects over the position of the parts of the exercise machine against which the user applies force, such as the handles. The program controls the actuators of the machine to apply forces and motions to the handles which correspond with the image and would be appropriate to move a virtual object of the mass and inertia which the image represents.

SOME EMBODIMENTS OF THE INVENTION

Figure 1:
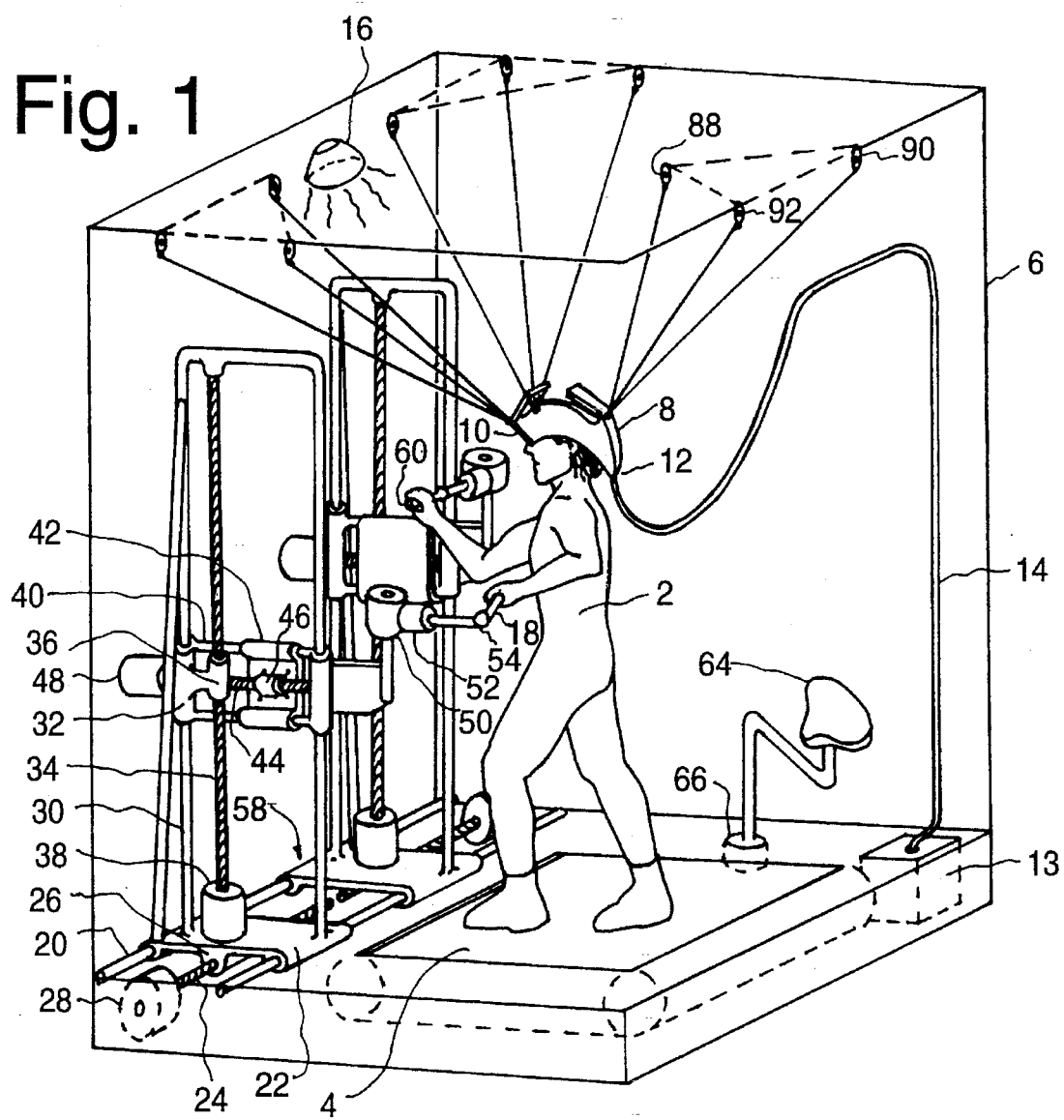
FIG. 1 is a perspective view of an embodiment of the invention, including a booth-like enclosure, exercise apparatus with ball screw actuators, sensors, computer, treadmill, and an image display helmet.

FIG. 1 illustrates a typical embodiment of the invention in which a hybrid between "virtual reality" and genuine reality is used. In this hybrid mode, the user sees both a computer-displayed image of a virtual environment, and some especially visible objects within the real environment, including the user's arms and hands, as well as the handles of the apparatus. In other embodiments utilizing more complete "virtual reality", the user may see only a computer display and may not directly view any part of his body or his real environment. The embodiment illustrated in FIG. 1 is also simplified in that only two handles are provided, and the user either stands or runs on a treadmill or sits on a seat. More complex embodiments which also include active interfaces for the feet, such as boots attached to servo-controlled mechanisms may be provided. Thus, pedaling, climbing, and other actions can be simulated.

Referring to FIG. 1, the user 2 stands on a treadmill 4 within a generally darkened booth 6. The user wears a display helmet 8 having a partially transparent projection screen 10 before his eyes, and a television projection system 12 mounted to the helmet. Audio speakers may also be provided in the helmet as well as a microphone to pick up the user's voice in embodiments where voice commands are recognized by the computer. Generally, various motors and sensors are illustrated in FIG. 1 which are connected to the computer via cables which are not included in the drawing. Details of the computer controls are also omitted for simplicity.

In the present embodiment, the television projection system utilizes fiber optics to transfer light beams from the main unit located remotely together with the computer 13, to the helmet 8 via an optic cable 14. Separate images may be projected to each eye to provide stereoscopic 3-D images. The partially transparent projection screen may be a half mirrored sheet of glass or other transparent material. Special coatings may be used to enhance the clarity of the image.

The user wears an exercise suit similar to a body stocking with gloves, which has a fluorescent surface highly visible under a particular wavelength of light, such as ultraviolet, shined on the user by a lamp 16. The handles of the exercise machine are also visible under this wavelength, but the remainder of the apparatus, including the structural frame members, servo-motors, force sensors, and the walls of the enclosure are all light-absorbent and essentially invisible to the user. Thus, when an image of proper intensity is projected on the screen of the helmet, the user sees it superimposed on the real objects in his visual field which are specially illuminated and fluorescent. The projected images and the real images are maintained in proper superimposed alignment by the computer system, which monitors the exact position of the helmet and the positions of the machine handles.

Figure 5:
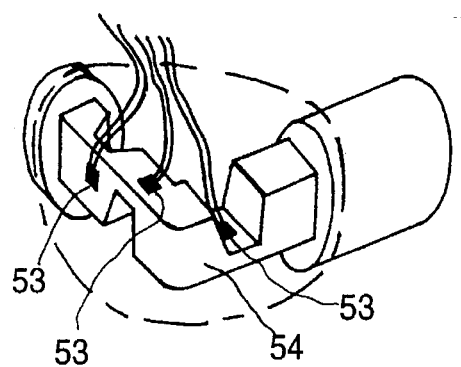
FIG. 5 is a perspective view of a 3-axis load-sensing device utilized to detect forces applied between the user and the machine structure via a handle. The position of a cover is indicated by the broken line.

Still referring to FIG. 1 the apparatus includes multi-axis, servo-controlled, actuators for each of the two handles, which are capable of positioning the handles to accommodate a wide range of motion for the exercising user, and are capable of applying high loads to the handles and measuring the applied forces. The major components of the actuator for the left handle 18 include a frame 20, slide 22, ball screw 24, ball nut 26, and servo-motor with an encoder to measure shaft rotational position 28, for the x-axis; a frame 30, slide 32, ball screw 34, ball nut 36, and servo motor with an encoder to measure shaft rotational position 38, for the y-axis; a frame 40, slide 42, ball screw 44, ball nut 46, and servo motor with an encoder to measure shaft rotational position 48, for the z-axis; and high torque servo-motors with encoders and gear heads, 50 and 52, for two additional axes of rotational motion of the handle. A multi-axis force transducer 54 (see FIG. 5) provides the computer 13 with a measurement of the magnitude and direction of force applied by the user to the handle (which also represents the force applied by the machine to the user). In this configuration, three strain gages 53 are mounted on a slotted block such that x-, y-, and z-axis forces are sensed.

A similar frame with servo-motors and sensors generally indicated at 58 is also provided for the right handle 60.

During exercise, the user may walk or run on the treadmill 4, or may sit on a seat, 64 which can be swiveled into or out of position by servo-motor 66.

Figure 2:
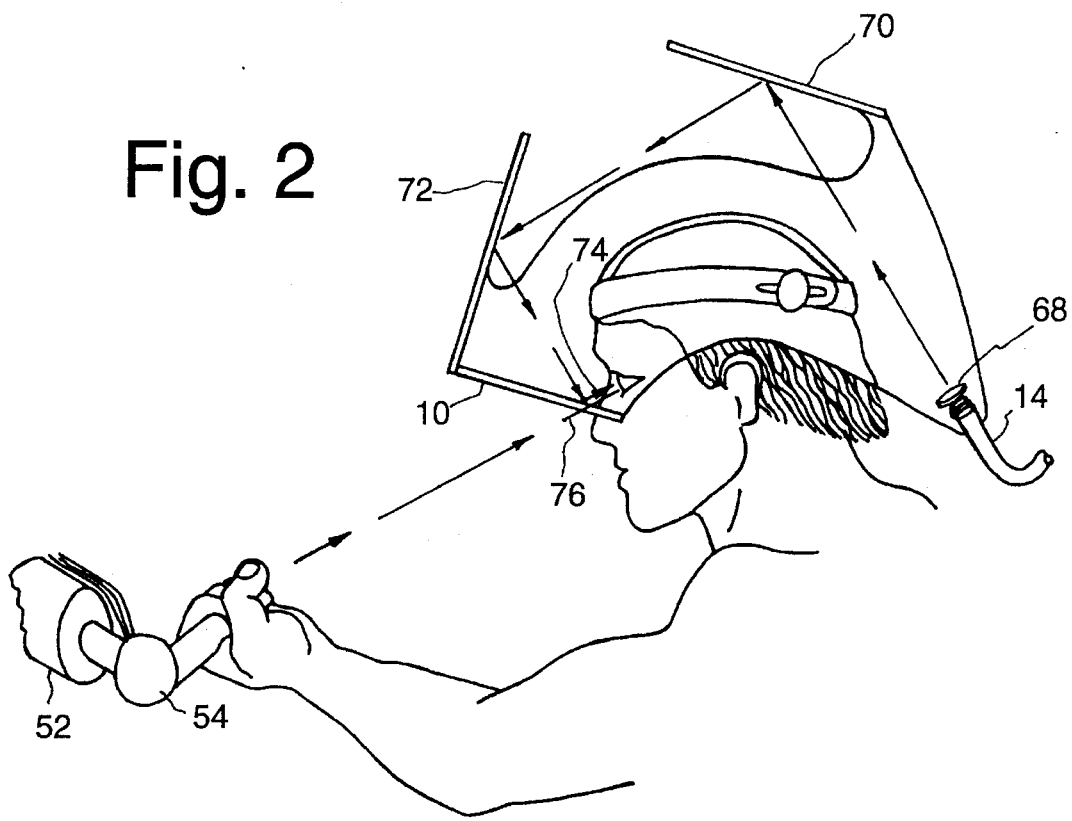
FIG. 2 is a diagrammatic drawing of a user wearing a head-mounted display helmet and gripping a handle of an exercise apparatus.

Referring to FIG. 2, details of the helmet and function of the hybrid virtual reality mode are illustrated. The partially transparent screen 10 receives an image projected onto it from the fiber optic cable 14 through a lens 68, via two mirrors 70 and 72. Light-ray path 74 from the screen to the eye coincides with the final portion of light ray path 76 from the hand to the eye. The light travels a distance between the lens and the screen of approximately 18 inches which is a typical distance from an average adult's eye to his hand when the elbow is partially bent. Such a position, represented in FIG. 2 is a very common one when utilizing the arms for relatively heavy lifting. Thus, during use of the exercise machine, the user's hands will be relatively close to this distance from his eye much of the time. When the user looks at his own hand, his eye will focus on it. The handle of the machine will be at this distance, if the user is holding it, and so it will also be in focus. Since the part of the image projected on the screen which represents the part of the virtual environment that the user is touching with his hand is superimposed at approximately the same focal distance, the image can also be presented in good focus. The lens in front of the fiber optic cable can also be moved by a servo-motor to adjust the focus to the real distance between the handle and the screen, because this distance is calculable by the computer from helmet position and handle position information.

Figure 4:
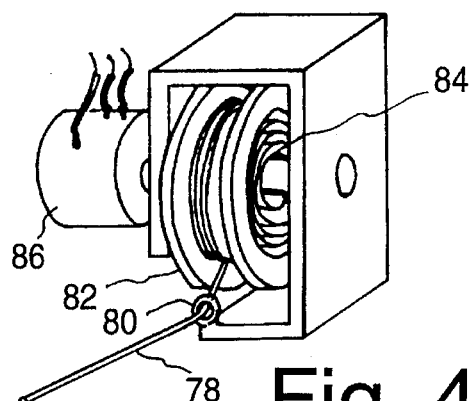
FIG. 4 is a drawing of one sensor assembly utilized to detect head-mounted display (helmet) position.
Figure 3:
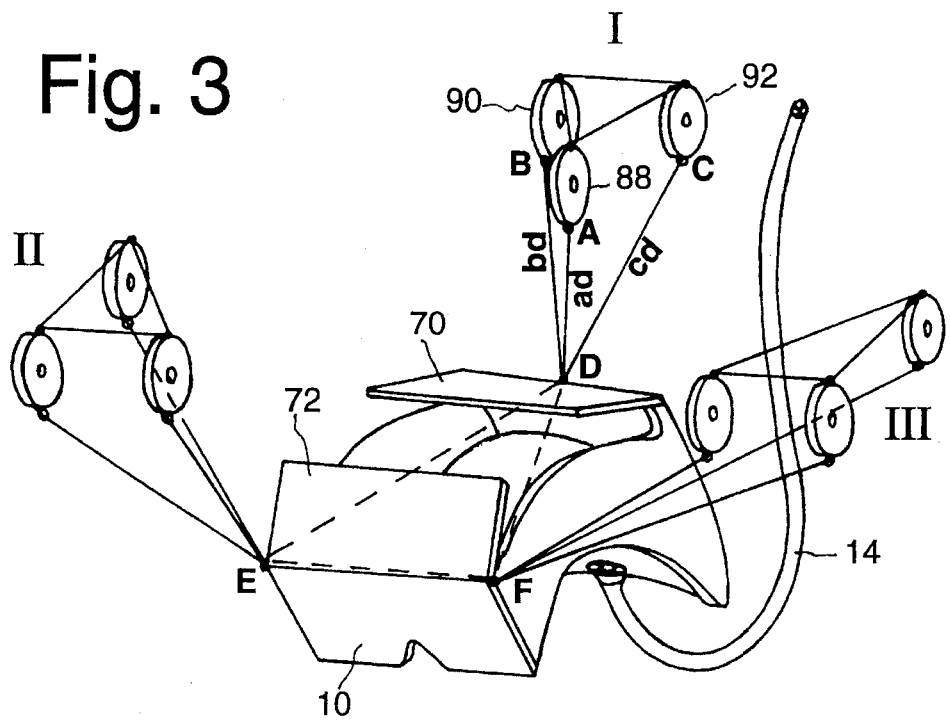
FIG. 3 is a perspective view of a head-mounted display and an array of sensors utilized to detect its location and orientation in space.

FIG. 3 illustrates the system utilized to provide the control information to the computer to permit calculation of the exact helmet position, and therefore to permit proper superimposition of the projected image with the real image viewed through the partially transparent screen. Three arrays of three transducers are utilized as illustrated generally at I, II, and III, in FIG. 3. Each of these transducers is comprised of a cable wound around a spring-retracted take-up spool which is in turn mounted to a multiple turn potentiometer or to a digital encoder, as shown in FIG. 4. In FIGS. 1, 3, and 6, only the take-up spools are shown, for clarity. As illustrated in FIG. 4, the cable 78 passes through an eyelet 80 and is wrapped around a spool 82 loaded by a band spring 84. As the cable is pulled out or permitted to be retracted by the spring, the length between the end of the cable (off the spool) and the eyelet is a function of the rotational position of the spool and the number of wraps of cable on the spool. The potentiometer 86 attached to the spool thus gives an analog signal proportional to the length of cable beyond the eyelet. Use of an A to D converter or suitable digital encoder in place of the potentiometer provides an appropriate input signal to the computer.

Referring again to FIG. 3, the three transducers in array I, 88, 90, and 92, are rigidly attached to the ceiling of the exercise booth as shown in FIG. 1. Their three eyelets, designated as points A, B, and C, thus form a triangle of known dimensions and orientation with relation to the frame of the exercise apparatus. The three cables are attached to a common point on the back of the helmet designated as point D. Since distances ab, bc and ac are fixed and are known, and since the transducer output signals permit calculation of lengths ad, bd, and cd, a tetrahedron with vertices ABCD is completely defined with the lengths of all sides known and the angles of one side (abc) known. By simple trigonometry and solid geometry, this permits the location of point D to be exactly calculated in three-dimensional space with relation to the exercise machine frame. The cables from transducer array II likewise are connected to the top front of the helmet at point E, and the cables of array III are connected to the helmet at point F. Thus, the transducer signals from all three arrays, taken together with information defining the position of all the eyelets permits computation of the exact position and orientation of the plane DEF through the helmet. This, together with the geometry of the helmet screen 10 in relation to plane DEF, permits computation of the position of the helmet screen.

Many other methods are available to compute the position of the helmet including light-beam measuring methods, and the use of helmets connected to rigid booms with position sensors. The present method employing an array of cables has the advantage that the spring forces on the cables can be selected so as to support most of the weight of the helmet, and the user can then move his head readily with little resistance.

Just as the specific device and method used to compute the position of the visual display screen can be varied without departing from the scope of the invention, the type of mechanism used to apply the forces of exercise, and the type of sensors used to detect the forces from moment to moment at the interfaces between the user and the machine may also be varied.

FIG. 6 illustrates an embodiment of the invention in which mechanisms and actuators to apply forces to the handles are configured to present a minimal amount of hardware within the user's visual field, and thus be effectively hidden from the user's attention. Referring to the mechanism actuating the user's left handle in FIG. 6, a hollow boom 94 supports the handle 96 mounted on rod 98 passing therethrough via a force-sensing array 54 which may be similar to that illustrated in FIG. 5. The boom passes through a rectangular slot 100 in a wall of the exercise booth which restricts rotational motion of the boom around its long axis. The rod, passing through the hollow core of the boom, is mounted on rotary bearings at each end and is connected to the shaft of a servo-motor 99 mounted on the opposite end of the boom. The boom is supported by six actuator cables 101, 102, 103, 104, 105, and 106 which pass through wear-resistant eyelets mounted to the wall of the booth. Three of the actuator cables are each fixed near one end of the boom, the remaining three are fixed near the other end of the boom, and each cable is also attached to a spool mounted to a servo-motor. For example, cable 106 is fixed to the boom at 108, passes through eyelet 110, and is wrapped on spool 131 connected to servo-motor 114 having encoder 116. In addition to the six actuator cables, an additional three position-sensing cables may be utilized paralleling the portions of each actuator cable between the boom and eyelet. These sensing cables are represented by a dashed lines 118, 120, and 122. Each is connected to a spring loaded take-up spool and potentiometer as illustrated in FIG. 4, shown at 124, 126, and 128. These positioning sensors provide a redundant control method to assure that there is no slack in the actuator cables.

The six actuator cables are led via the eyelets to each of six actuator motor spools 131, 132, 133, 134, 135, and 136. The rotary position of each spool is detected by a separate sensor such as a motor shaft encoder which provides the computer with control signals proportional to the length of each cable which are maintained taut. The motors and encoders for each cable attached to each spool are similar to those shown for cable 105 (motor 114, encoder 116) but most of these have not been included in the drawing for clarity. The physical arrangement of the boom, cables and eyelets defines two tetrahedra having a common side and vertices opposite the common side which lie near the ends of the boom. Given that the lengths of the sides of the common bases of the two tetrahedra are known and all the lengths of the other sides are determined (by the control signals) the position of the boom in three-dimensional space is calculated by the computer. Via the servo-motors and this frame, cable, and boom mechanism, and information from the force sensors attached to the handle at 54, software in the computer can be run to move the handle to any position within its operational range, and the force and direction of force applied by the boom in each position can be controlled.

The position of another boom for an actuator mechanism for the right handle is illustrated at 138 but the cables, spools, servo-motors and sensors are not shown in the drawing to avoid confusion with the components of the left handle actuator mechanism.

Figure 9:
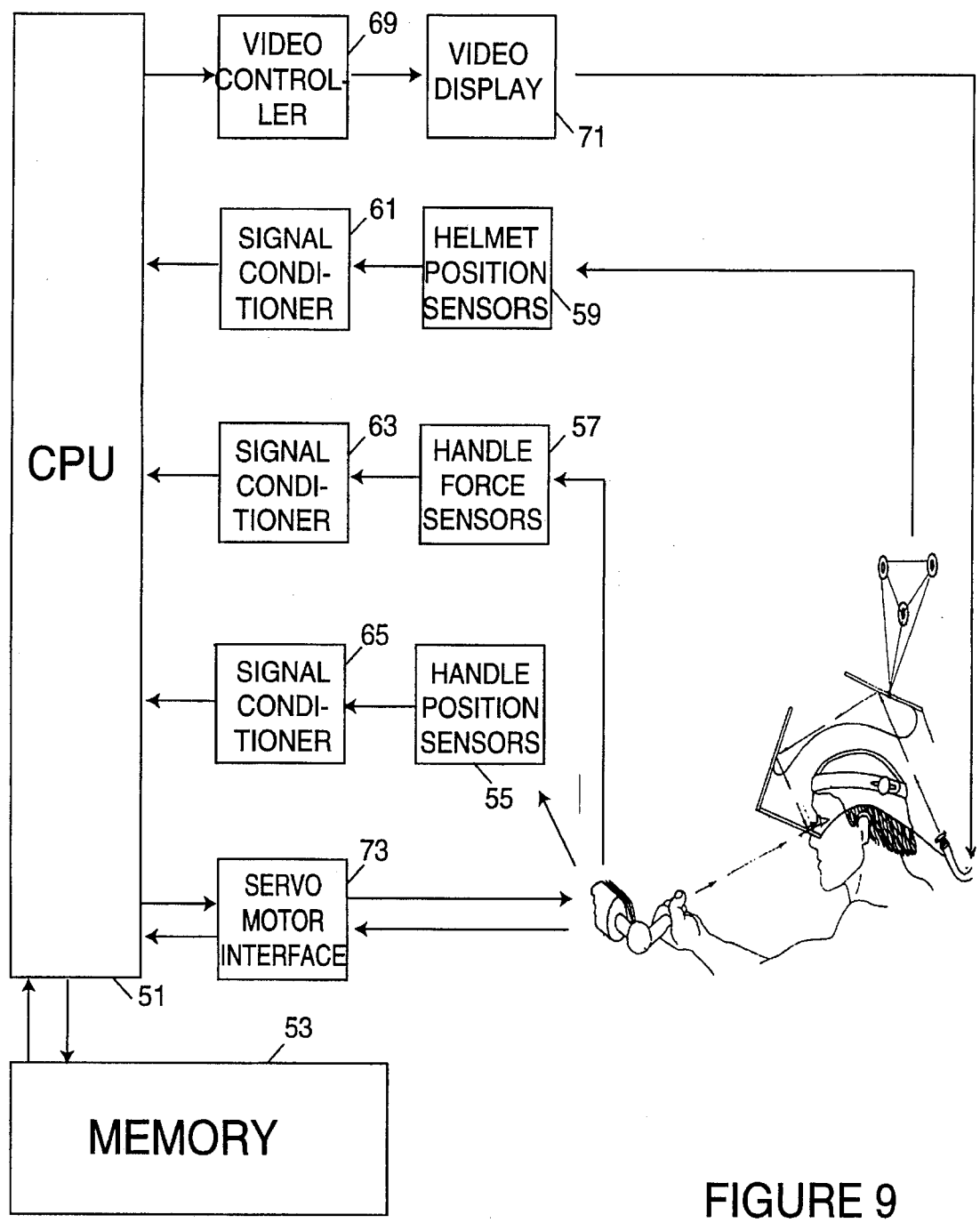
FIG. 9 is a block diagram of the preferred embodiment of the present invention.

FIG. 9 illustrates the basic components of the Computer and its interface with the sensors and actuators of the exercise machine. The central-processing unit (CPU) conducts the main computing functions of the computer and is connected both to memory 53 which stores data about both the virtual environment with virtual objects and data about the real environment including the physical positions, motions, and forces applied to and by the exercise machine structure and its actuators. The CPU receives inputs from various sensors including handle position sensors 55, handle force sensors 57, and helmet position sensors 59 which offer appropriate signal conditioning by signal conditioners 61, 63, and 65, which may include analog-to-digital converters, amplifiers, or certain preprocessors. Based on the data from the sensors, by making appropriate calculations according to the system's programs, the CPU sends the necessary output signals to the video controller 69 which in turn drives the video display 71 to present the image to the user. The CPU also sends and receives servo control signals from servo-motors which actuate the exercise machine via the servo-motor interface 73.

Referring to FIG. 10, the basic computer program which is used superimposes a computer image of a scene containing virtual objects over the position of the parts of the exercise machine against which the user applies force, such as the handles. The program controls the actuators of the machine to apply forces and motions to the handles which correspond with the image and would be appropriate to move a virtual object of the mass and inertia which the image represents. The program utilizes data from the sensors described above which permits computation of the position of the handles and the forces applied thereby and thereto. Data from the sensors of the position of the helmet in relation to the physical structure of the exercise machine is obtained, which is used to compute the vantage point of the user (corresponding to the physical position of the display screen that is mounted in the helmet). The program generates the necessary control and display signals to maintain superimposition of the computer image and the handle, and to match the force applied by the exercise machine's actuators to the appropriate force to move the virtual object. Many variations of computer program organization and function may be employed, depending on the exact hardware used with each embodiment of the invention or the particular virtual reality environment and objects which the software writer wishes to provide. As an illustration, intended to be representative of the function of a typical program provided to run the exercise machine, is the program used in the example given in the SUMMARY OF THE INVENTION section, where opening a virtual door is described. In that example, the basic sequential steps of the computer program, as illustrated in FIG. 10, are as follows:

75 Start

77 Set clock to t=0 sec.

79 Read the computer memory data file of the virtual objects (the door, door frame, and other details of the scene) from computer memory including data concerning geometry, mass, and motion.

81 Sense the three dimensional position of the exercise machine handle at t=0 sec.

83 Sense the three dimensional position and orientation of the helmet mounted display screen at time t=0 sec.

85 Compute the perspective view of the virtual objects as seen from the helmet position relative to the exercise machine handle at t=0 sec.

87 Display the perspective view of the virtual object (door handle) on the helmet screen visually superimposed over the real three dimensional position of the exercise machine handle at t=0 sec. (Note that because the user will see his or her own hand through the display screen actually grasping the machine handle, it will appear that the user is grasping the virtual object.)

89. Sense the forces applied to the exercise machine handle by the user at t=0 sec. in the various axes measured.

91 Compute the velocity, acceleration, and direction of motion that the sensed forces would impart to the virtual objects if they were real.

93 Compute the positions velocity, and acceleration that the virtual objects would reach in a finite time interval (about 1/30 sec. for one frame) between t=0 and t=0.03 sec.

95 Update the computer memory data file.

97 Compute the force the object would exert on the handle and other virtual objects at time t=0.03 sec. including the force vectors in the direction of each axis.

99 Compute and send servo command signals to the actuator motors to move the actuator handle to the position the part of the virtual object corresponding to the machine handle would reach at time t=0.03 sec. calculated in step 9 above and apply the forces calculated in step 10 above.

111 Sense the three dimensional position and orientation of the helmet mounted display screen at time t=0.03 sec.

113 Compute the perspective view of the virtual objects as seen from the helmet position relative to the exercise machine handle at t=0.03 sec.

115 Display the perspective view of the virtual object (door handle) on the helmet screen visually superimposed over the real three dimensional position of the exercise machine handle at t=0.03 sec. (Note that because the user will see his or her own hand through the display screen, and the user's hand will move together with the exercise machine handle between t=0 sec. and t=0.03 sec. it will appear that the user is moving the virtual object.)

77 Reset the clock to t=0 sec.

Repeat steps 79–115 or stop.

The embodiment shown in FIG. 6 includes two position-sensing arrays of cables, spools, and potentiometers, which are provided to sense the positions of the user's feet. These arrays, generally indicated at 140, and 142, are attached to fasteners 144, 146, on the lateral sides of the user's shoes. As the user walks or runs on the treadmill, the length of his stride and frequency is calculated, permitting the computer to monitor his speed, compute the distance he travels, and implement other functions, such as automatically adjusting the speed of the treadmill to the speed of the user, so that he does not need to pay attention to the treadmill and has a greater sense that he is walking on the surface of a virtual environment as presented by the headset visual display.

In some embodiments of the invention, the virtual environment viewed by the user may be a composite of photographic images with superimposed computer-generated images, and additionally may incorporate superimposed images of the user's body and parts of the exercise machine which are directly viewed.

The embodiment of FIG. 6 utilizes a video camera 148, mounted to the headset so as to receive an image of the field of view in front of the user via light reaching the lens as indicated by arrows 149. The user wears fluorescent clothing preferentially illuminated compared to the background and mechanism via ultraviolet light form lamp 16. Alternatively, other wavelengths and special filters may be used with the camera, 148. The image of the user's arms, hands, body, legs, and feet thus obtained is superimposed by the computer, over other images on the video display screen, 150, shown here inside a helmet, to create the complete virtual environment scene. In this way, no sensors are required on the user to provide position information for an image of the user's body on the screen. The video image of the user, of course, moves in perfect synchrony with him, which helps to provide a very realistic virtual reality illusion with minimal computational requirements compared to other methods, such as animated real-time images representing the user's body presented on the screen.

A device to provide appropriate photographic images of remote locations which may be used in combination with computer graphics, includes video cameras 152, and 154 which are equipped with sensors to monitor the position while the video image is recorded and to make a simultaneous recording of this position information to orient the image on the screen when it is replayed. The camera may be equipped with a compass 156 and a level detector 158 which record the orientation of the camera's field of view in reference to magnetic north and to the level of the horizon. The camera may alternatively be equipped with a gyroscopic position-sensing system or other system such as a satellite locator receiver to record its position in space.

To achieve the "virtual reality" effect which in this case represents the perception by the user that he is present in a three-dimensional place represented by the images he sees and can interact there, the video image recorded is a wide angle image, preferentially as close to the full 360 degree field of view as is practical with advanced optics, including multiple cameras if necessary. The recorded field of view of the scene is thus much wider than the field of view presented on the screen during playback. The field of view of the playback display is no wider than the normal human field of view and may be considerably narrower. In FIG. 7, the cameras 152 and 154 are equipped with wide angle lenses 160 and 162 which each provide a field of view 150 degrees wide by 150 degrees high. The two combined images thus represent a field 300 degrees by 150 degrees. This is represented by the large rectangle 164 of FIG. 8 which is a flat map of the field.

The playback and viewing device includes a head-mounted display and computer system to match the portion of the recorded image displayed to the actual orientation in space of the head-mounted display screen. Thus, the correspondence of the displayed image to the orientation of the head mounted screen provides the user with the view that he would have had if he had been at the actual location where the camera was situated when the video was recorded and moved his head to look in different directions.

With the camera level, the horizon is represented by line 166 in FIG. 8, and with the camera array directed north as illustrated in FIG. 7, the position of the north direction is indicated by line 168 on the map of the camera view field in FIG. 8. With the camera array pointed in any direction, the position information encoded by the compass and level detector permit the computer to locate reference points on the camera field map with regard to the horizontal/vertical and north/south directions. The small solid line rectangle 170, in FIG. 8 corresponds to a viewing screen angular field of 160 degrees by 100 degrees, somewhat less than the normal human combined right-eye/left-eye total angular field of about 180 degrees by 115 degrees. The computer system utilizes position-sensor information to ascertain the actual physical orientation of the screen in the helmet, and when the helmet is level and facing due north, the computer will present an image recorded by a camera in the same position (level and facing north) as indicated by rectangle 170. If the user then turns his head upward and to the left the computer will present an image on the screen corresponding to the portion of the map represented by dotted rectangle 172. The computer also is provided with software permitting the orientation of image to be adjusted to the north/south alignment of the booth within which the machine is contained such that absolute direction is unimportant during use.

In systems where the replayed camera-recorded video is only part of the overall image perceived by the viewer, a computer-generated image of an object may be superimposed on the recorded scene. The position of the computer-generated object image in the visual field as well as the perimeter of the image are contained in computer memory for each frame of a motion picture output by the computer. This position and perimeter information is utilized to turn off the portion of the recorded video that would have been displayed within the perimeter of the computer-generated object and thus avoid projecting two different overlaying images onto the viewing screen simultaneously. The result is a camera-recorded background with computer-generated objects filling in voids of matching size, position, and shape, deleted from the camera recorded image. Alternatively, the "foreground" objects may originate from camera-recorded images and the background may be computer-generated, or a combination may be used, such as in embodiments where a video camera receives the image of the user's body.

Examples of "virtual reality" exercise machines using camera-recorded images and camera-recorded images combined with computer-generated images include bicycle ride and bicycle race configurations. For example, to create the visual background, a very wide angle video camera with orientation sensors and recorder is mounted on a vehicle and driven along a road at a constant speed with no other traffic while the camera is photographing the scene. If the speed is a typical bicycling speed and the video is recorded at a somewhat high number of frames per second, such as 30, then by varying the playback speed it will appear that the bicycle is traveling at a rate of speed which can be either more or less than the actual speed of the vehicle when the recording was made. The rate at which the pedals of a stationary exercise machine are rotated represents the rate at which a real bicycle would travel while pedaling. The computer is programmed to vary the playback rate of the video recording as a function of the pedal speed such that the user perceives motion at the speed he is pedaling. Algorithms to represent coasting may be incorporated. With the head-mounted video display the user can turn his head and see the appropriate scene as if he were looking in the particular direction his head is oriented while riding a bicycle on a real road. This creates a very realistic interactive "virtual reality" effect.

If the road on which the video camera recording is made is entirely straight, the simulated trip made along the road would not require simulated steering. For example, if the road ran due north, and the person on the exercise machine held his head straight (i.e. not turned to either side) as the video recording was played back, he would face due north along the center of the road during the entire trip. However, if the road along which the video recording was made was curved, say, 90 degrees and headed east, as the person exercising viewed the portion of the tape corresponding to the curve, he would have to turn his head 90 degrees to the right retain a view along the center of the road. The apparent forward direction of his bicycle would remain north, and it would seem that he should travel off the side of the road. To avoid this, a simulated steering mechanism and control system is provided. The position of the exercise bicycle handle bars are measured by a sensor that provides a control signal to the computer. The north/south orientation of the image displayed is modified according to this control signal to permit the exerciser to follow the road and maintain the centered alignment of his body and the exercise bicycle with an apparent course down the center of the road. The computer may calculate the radius of curvature that the path of a real bicycle would make at a given speed and adjust the rate of modification of the visual image to correspond to this. Thus, if the exerciser were stopped and not pedaling at all and he turned the handle bars, the image would appear stationary unless he turned his head. But if the exerciser were peddling and turned the handle bars without turning his head, the image would move as if the bicycle were turning.

In a bicycle race exercise machine, the same video recording and system as described in the preceding paragraphs can be enhanced by providing a computer-generated image of a competing bicycle rider superimposed on the roadway and background scenery. The user will thus see the competitive image either ahead or behind by turning his head around (provided a wide enough field of view is photographed). The user may "compete" against a computer-simulated competitor, or two exercise machines with two competing individuals may be interconnected, such that the position of the image of the competitive rider that each sees corresponds to the appropriate position represented by the complete history of pedal rotation of the real competitor since the beginning of the race. This creates a "real" race in a virtual environment. Innumerable variations of this are possible utilizing machines which simulate many kinds of physical activity in many settings.

The information disclosed in the description of the present invention is intended to be representative of the principles that I have described. It will thus be seen that the objects of the invention set forth above and those made apparent from the preceding description are efficiently obtained and that certain changes may be made in the above articles and constructions without departing from the scope of the invention. It is intended that all matter contained in the above description or shown in the accompanying drawings shall be interpreted as illustrative but not in a limiting sense. It is also understood that the following claims are intended to cover all of the generic and specific features of the invention herein described and all statements of the scope of the invention which as a matter of language might be said to fall there between.

I claim:

1. An interactive computer controlled exercise system adapted to apply multiple forces with motion to the body of the user corresponding with the computer generated visual images of an environment presented on a display, said system comprising:

a movable powered structure means having movable components connected to a fixed support frame means adapted to apply forces to the body of the user in conjunction with forces applied by the user to the movable components of said movable powered structure means, so as to provide health benefit to the user during exercise with said movable components of said movable powered structure means;

means for sensing the force and position of said movable components of said movable powered structure means and forces applied thereto by the user and to provide the sensed signals to a computer means;

means for detecting and measuring the position and orientation of the user's head and to provide the detected signals to said computer means;

powered actuator means for altering the three dimensional configuration and motion of said movable powered structure means and for applying forces of variable magnitude and direction to the body of the user in conjunction with corresponding forces applied by the user to said movable components of said movable powered structure means;

visual display means for presenting virtual images superimposed over the position of said movable powered structure means in real time maintained in visual perspective from the vantage point of the user when the user moves, said virtual images comprise a pictorial representation of a virtual environment with virtual objects oriented and movable relative to the user such that if real objects existed in place of said virtual environment, contract between said virtual objects and the user would apply forces to the user's body similar to the forces applied to the user's body by said movable components of said movable powered structure means; and said computer means, responsive to the sensed signals from said sensing means and the detected signals from said detecting means, for calculating said three dimensional configuration and motion of said movable powered structure means and forces applied thereto by the user and the position of the user's head in relation to said fixed support frame means, thereby to control said powered actuator means and said visual display means.

2. The exercise system of claim 1, wherein said computer means comprises memory means and program means, said program means adapted to:

store data for defining said virtual objects in said memory and present said virtual images of said virtual objects on said visual display means;

receive said sensed signals from said sensing means and said detected signals from said detecting means, and compute said three dimensional configuration and motion of said movable powered structure means, the direction and magnitude of forces applied thereto by the user, and the position and orientation of said user's head relative to said fixed support frame;

control the motion of said movable powered structure means via said powered actuator means; and present a virtual image of said virtual objects on said visual display means as seen from said user's vantage point superimposed over the position of said movable components of said movable powered structure means, so as to create the realistic illusion that said user is moving said virtual objects when said user applies force to said movable components of said movable powered structure means during exercise.

3. The exercise system of claim 2 further comprises head-mounted video camera means adapted to photograph the hands and body of said user and some movable components of said movable powered structure means which said user may contract; and said computer means adapted to superimpose the image of said user from said video camera on said virtual images of said virtual environment while at least one of said movable components of the movable powered structure means is moved by said powered actuator means.

4. The exercise system of claim 1, wherein said visual display means comprises a head-mounted partially transparent viewing screen.

5. The exercise system of claim 4 further comprises light source means by which the user's arms and hands are preferentially illuminated so as to be more clearly visible than non-illuminated parts of the exercise system that lie within the user's visual field.

6. The exercise system of claim 1 further comprises wide-angle video camera means having at least one camera adapted to record an image encompassing a high proportion of the field of view surrounding said camera in all direction; and sensor and control signal recording means for measuring and recording reference information simultaneously with the recording of the image; wherein said computer means superimposes said recorded video images from said wide-angle video camera means with said virtual images of said virtual environment presented on said visual display means.

* * * * *